US010015490B1

United States Patent
LeGall et al.

(10) Patent No.: US 10,015,490 B1
(45) Date of Patent: Jul. 3, 2018

(54) HIGH EFFICIENCY VIDEO CODING FOR VIDEO WITH INTERLACED AND PROGRESSIVE CONTENT USING LOOKAHEAD

(71) Applicant: Ambarella, Inc., Santa Clara, CA (US)

(72) Inventors: Didier LeGall, Los Altos, CA (US); Aaron G. Wells, Walnut Creek, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 15/718,257

(22) Filed: Sep. 28, 2017

Related U.S. Application Data

(60) Division of application No. 14/953,996, filed on Nov. 30, 2015, now Pat. No. 9,826,234, which is a continuation of application No. 13/711,947, filed on Dec. 12, 2012, now Pat. No. 9,247,196.

(60) Provisional application No. 61/694,972, filed on Aug. 30, 2012.

(51) Int. Cl.
*H04N 19/00* (2014.01)
*H04N 19/112* (2014.01)
*H04N 19/136* (2014.01)

(52) U.S. Cl.
CPC ......... *H04N 19/112* (2014.11); *H04N 19/136* (2014.11)

(58) Field of Classification Search
CPC .................................................. H04N 19/112
USPC ..................................................... 375/240.01
See application file for complete search history.

(56) References Cited

U.S. PATENT DOCUMENTS

| 5,574,504 A | 11/1996 | Yagasaki .................. 375/240.13 |
| 6,310,915 B1 * | 10/2001 | Wells ............... H04N 21/23406 348/405.1 |
| 2004/0120397 A1 | 6/2004 | Zhang et al. ............ 375/240.03 |
| 2004/0136461 A1 * | 7/2004 | Kondo ................. H04N 19/105 375/240.16 |
| 2005/0041742 A1 | 2/2005 | Abe ......................... 375/240.24 |
| 2006/0050786 A1 * | 3/2006 | Tanizawa ............. H04N 19/176 375/240.03 |
| 2010/0074339 A1 | 3/2010 | Yonemoto et al. ...... 375/240.24 |
| 2013/0107957 A1 | 5/2013 | Rabinovitch et al. ... 375/240.15 |

* cited by examiner

*Primary Examiner* — Jeffery Williams
(74) *Attorney, Agent, or Firm* — Christopher P. Maiorana, PC

(57) ABSTRACT

An apparatus includes an interface and a circuit. The interface may be configured to receive a video signal comprising a plurality of interlaced fields and a plurality of progressive frames. The circuit may be configured to (i) generate a plurality of segments by parsing the video signal, (ii) encode the segments as both (a) a plurality of frame segments in a frame mode and (b) a plurality of field segments in a field mode and (iii) generate an encoded signal based on the frame segments and the field segments.

20 Claims, 14 Drawing Sheets

HIGH EFFICIENCY VIDEO CODING FOR VIDEO WITH INTERLACED AND PROGRESSIVE CONTENT USING LOOKAHEAD

This application relates to U.S. Ser. No. 14/953,996, filed Nov. 30, 2015, now U.S. Pat. No. 9,826,234, which relates to U.S. Ser. No. 13/711,947, filed Dec. 12, 2012, now U.S. Pat. No. 9,247,196, which claims the benefit of U.S. Provisional Application No. 61/694,972, filed Aug. 30, 2012, each of which is incorporated by reference in their entirety.

FIELD OF THE INVENTION

The present invention relates to digital video encoding generally and, more particularly, to high efficiency video coding for video with interlaced and progressive content using lookahead.

BACKGROUND OF THE INVENTION

Interlaced scan is the original method of television and video acquisition. Until liquid crystal displays and plasma televisions became standard in the 2000's, all television displays (i.e., cathode ray tubes) were interlaced. At the current time, all standard definition television is interlaced. "True HD" (i.e., high definition) programming is still formatted as 1920×1080 interlaced at 60 hertz. Progressive scan is an alternative acquisition format (i.e., 1280×720 progressive or 1920×1080 progressive). After editing, video production is commonly a mix of interlaced and progressive material.

The transitions from one format to another can be anything from an abrupt switch (i.e., an advertisement splice) to a gradual dissolve where an interlaced scene is cross-faded onto a progressive scene. Additionally, video can comprise sections of interlaced video and progressive video composited spatially, for example, a progressive movie with an interlaced text "crawl" along the bottom.

It would be desirable to implement high efficiency video coding for video with interlaced and progressive content using lookahead.

SUMMARY OF THE INVENTION

The present invention concerns an apparatus including an interface and a circuit. The interface may be configured to receive a video signal comprising a plurality of interlaced fields and a plurality of progressive frames. The circuit may be configured to (i) generate a plurality of segments by parsing the video signal, (ii) encode the segments as both (a) a plurality of frame segments in a frame mode and (b) a plurality of field segments in a field mode and (iii) generate an encoded signal based on the frame segments and the field segments.

The objects, features and advantages of the present invention include providing high efficiency video coding for video with interlaced and progressive content using lookahead that may (i) provide efficient switching between a field mode encoding and a frame mode encoding, (ii) provide an all-field coding and an all-frame coding in parallel, (iii) provide a single pass coding with lookahead, (iv) be implemented in a hybrid encoder and/or (v) control a high efficiency video coding.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Video compression standards (e.g., MPEG2, H.264) generally permit a mixing of frame-content and field-content on a picture-by-picture basis (e.g., PAFF=picture adaptive field/frame coding) or a block-by-block basis (e.g., MBAFF=macroblock adaptive field/frame coding). In contrast to the older compression standards, a high efficiency video coding (e.g., HEVC) draft standard (e.g., JCTVC-H1003 by the Joint Collaborative Team on Video Coding of ITU-T SG16 WP3 and ISO/IEC JTC1/SC29/WG11) generally does not permit any mixing of field and frame pictures in a sequence. Instead, the field and frame pictures may be coded in separate sequences.

In HEVC encoding, inter-field coding is generally possible and inter-frame coding is possible, but no possibility may exist to predict a frame from a field or vice-versa. Therefore, any transition from a field sequence to a frame sequence may force an inclusion of an intra picture. Transitions between sequences are generally expensive because of the inclusion of the intra pictures (e.g., poor compression), so the transitions should occur only infrequently at normal operating points. If interlaced/field material is coded as a sequence of progressive frames, the compression ratio is generally poor. If progressive/frame material is coded as a sequence of fields, compression efficiency may suffer, though generally not as much.

Some embodiments of the present invention may provide a method and an apparatus to optimize the coding of video compression of hybrid interlaced/progressive video material at a segment level. A means of identifying an optimal (or best) coding mode may be provided. An optimal (or good) strategy for switching from a current coding mode to the other coding mode may also be provided, given that the transitions from one mode to the other mode are generally expensive and may temporarily limit an ability of the encoder to adapt to content transitions.

Figure 1:
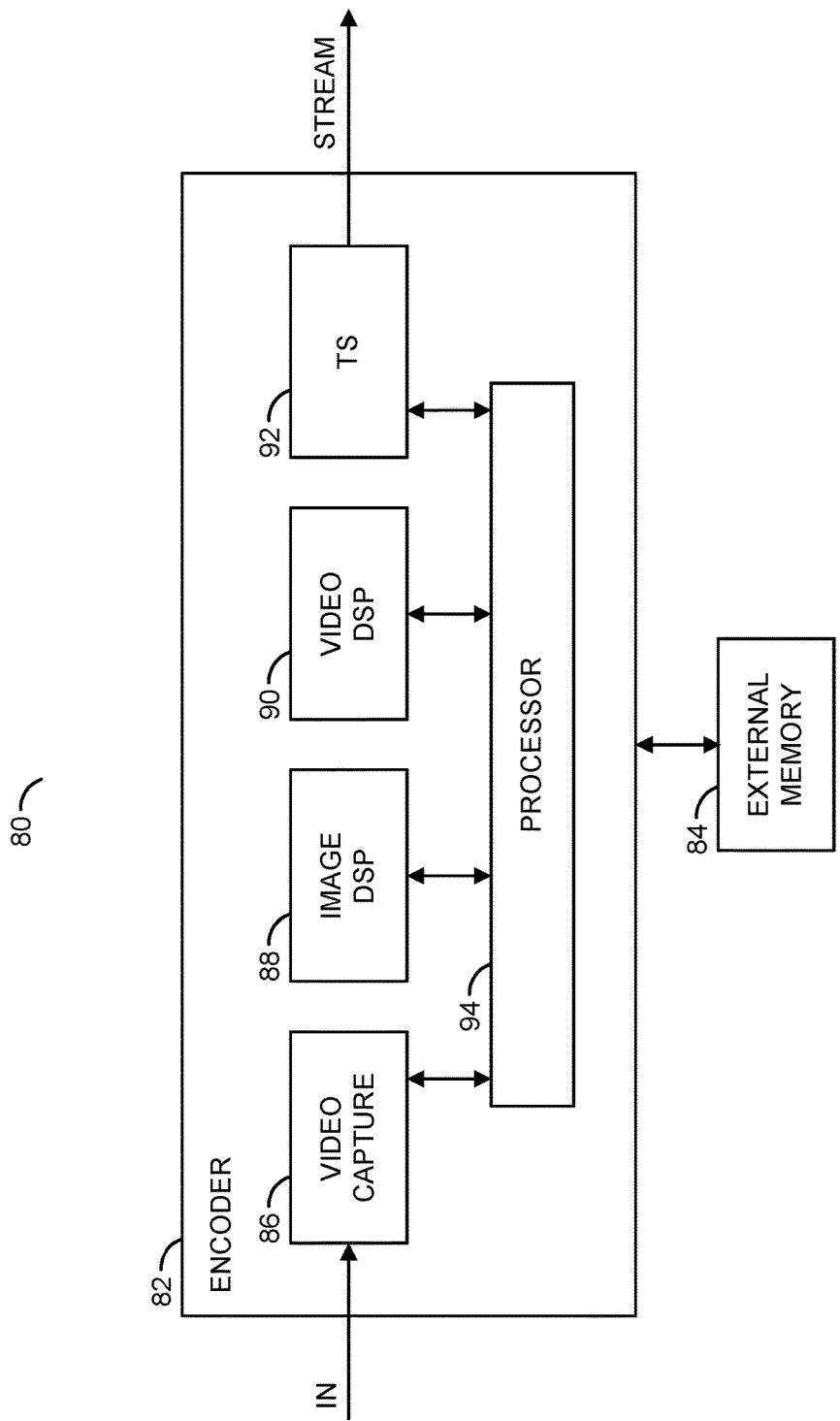
FIG. 1 is a block diagram of an example implementation of an encoding system.

Referring to FIG. 1, a block diagram of an example implementation of an encoding system 80 is shown. The system (or apparatus) 80 may include an encoder block (or circuit) 82 and a memory block (or circuit) 84. The encoder circuit 82 generally comprises a video capture block (or circuit) 86, an image digital signal processor (e.g., DSP) block (or circuit) 88, a video DSP block (or circuit) 90, a transport stream (e.g., TS) block (or circuit) 92 and a processor block (or circuit) 94. The circuits 80-94 may be implemented as hardware, software or a combination of hardware and software.

A signal (e.g., IN) may be received by the video capture circuit 86. The signal IN generally carries the video signal to be encoded. A signal (e.g., STREAM) may be generated by the TS circuit 92. The signal STREAM may implement a transport stream that carries the compressed and encoded video.

The circuit 82 may implement an encoder circuit. The circuit 82 may be operational to encode video information received in the signal IN to generate the signal STREAM. The encoding may be compliant with the HEVC draft standard. Other video codecs may be implemented to meet the criteria of a particular application. The circuit 82 may be fabricated in (on) a single integrated circuit die or chip.

The circuit 84 may implement an external memory circuit. The circuit 84 is generally operational to store multiple video frames, fields or pictures, including one or more reference frames, one or more frames to be processed and one or more processed frames. In some embodiments, the circuit 84 may implement a double data rate (e.g., DDR) synchronous dynamic random access memory (e.g., SDRAM). Other memory technologies may be implemented to meet the criteria of a particular application. The circuit 84 may be fabricated as one or more dies separate from the circuit 82 fabrication. In some embodiments, the circuit 84 may be fabricated in (on) the same die as the circuit 82.

The circuit 86 may implement a video capture circuit. The circuit 86 is generally operational to capture data from the signal IN. Where the signal IN is implemented as an analog signal, the circuit 86 may also be operational to digitize the video data.

The circuit 88 may implement an image DSP circuit. The circuit 88 is generally operational to provide motion compensated temporal filtering, scaling and other functions used during encoding operations.

The circuit 90 may implement a video DSP circuit. The circuit 90 is generally operational to perform high speed processing on the video data as part of the encoding operations.

The circuit 92 may implement a transport stream generation circuit. The circuit 92 is generally operational to format the encoded video information into a transport stream compliant with the HEVC draft standard. The resulting transport stream may be presented in the signal STREAM.

The circuit 94 may implement an embedded processor circuit. The circuit 94 may be operational to control the overall operations of the circuit 82. In some embodiments, the circuit 94 may be implemented as an ARM processor. Other processor technologies may be implemented to meet the criteria of a particular application.

Figure 2:
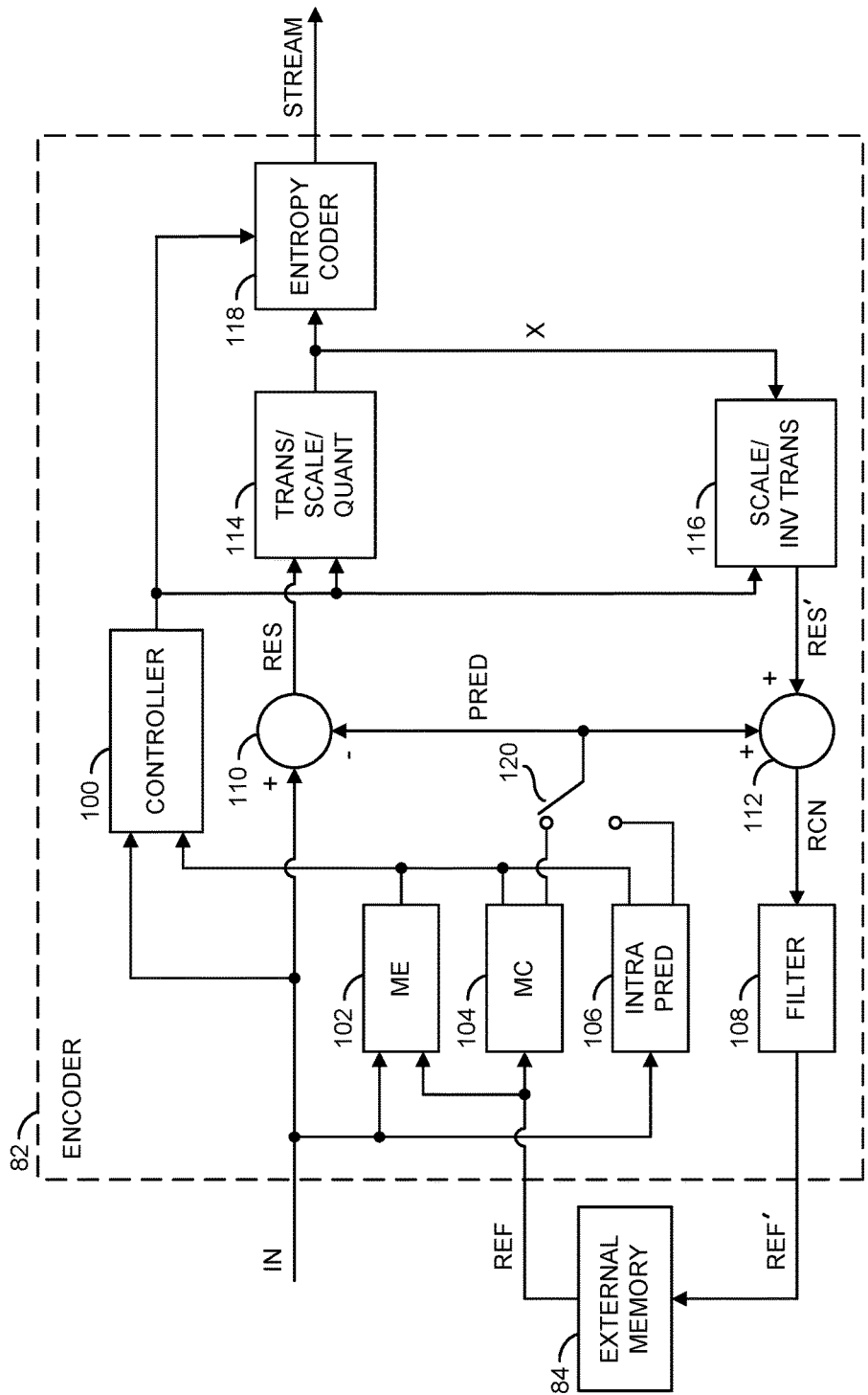
FIG. 2 is a functional block diagram of an encoder.

Referring to FIG. 2, a functional block diagram of the encoder circuit 82 is shown. The encoder circuit 82 generally comprises a controller step (or function) 100, a motion estimation (e.g., ME) step (or function) 102, a motion compensation (e.g., MC) step (or function) 104, an intra-prediction step (or function) 106, a filter step (or function) 108, an adder step (or function) 110, another adder step (or function) 112, a transform/scale/quantization step (or function) 114, a scale/inverse transform step (or function) 116, an entropy coder step (or function) 118 and a switch step (or function) 120. The encoder 82 may implement a hybrid video codec. The steps 100-120 may be implemented as hardware, software or a combination of hardware and software.

The signal IN may be received by the controller step 100, the ME step 102, the intra-prediction step 106 and the adder step 110. The signal STREAM may be generated by the entropy coder step 118. The MC step 104 and the ME step 102 may receive reference picture data from the memory circuit 84 in a signal (e.g., REF). The filter step 108 may generate and transfer new reference pictures to the memory circuit 84 in a signal (e.g., REF'). A residual signal (e.g., RES) may be generated by the adder step 110 and transferred to the transform/scale/quantization step 114. The signal RES may convey residual information produced by subtracting picture blocks from prediction blocks. The transform/scale/quantization step 114 may generate and transfer a signal (e.g., X) to the entropy coder step 118 and the scale/inverse transform step 116. The signal X may carry the transformed, scaled and quantized data representative of the residual blocks. A residual signal (e.g., RES') may be generated by the scale/inverse transform step 116 and presented to the adder step 112. The signal RES' may carry reconstructed residual information. A prediction signal (e.g., PRED) may be generated by the MC step 104 or the intra-prediction step 106, depending on the encoding mode. The signal PRED generally carries the prediction blocks used by the adder steps 110 and 112. The signal PRED may be routed from one of the steps 104 or 106 to the adder steps 110 and 112 by the switch step 120. A reconstructed signal (e.g., RCN) may be generated by the step 112 and transferred to the step 108. The signal RCN may convey reconstructed blocks, similar to the block received in the signal IN. A reference signal (e.g., REF') may be generated by the step 108 and transferred to the circuit 84. The signal REF' may carry reconstructed reference blocks used to create the reference pictures.

The control step 100 may implement an encoding control function. The step 100 is generally operational to control encoding of the video signal using multiple (e.g., two) approaches parallel encoding and single pass encoding. The video signal generally comprises multiple interlaced fields and multiple progressive frames. The encoding generally comprises a high efficiency video coding.

In a parallel encoding approach, the step 100 may control the encoding to (i) generate multiple segments by parsing the video signal, (ii) encode the segments as both (a) multiple frame segments in a frame mode and (b) multiple field segments in a field mode and (iii) generate an encoded signal based on the frame segments and the field segments.

In a single pass encoding with lookahead approach, the step 100 may control the encoding to calculate costs of being interlaced within each of multiple windows in the video signal, (ii) determine access points in the video signal and (iii) encode the video signal with switching between the field mode and the frame mode at one or more of the access points based on the costs. The step 100 may be implemented by the circuit 82 (e.g., the circuit 90 and/or the circuit 94).

The ME step 102 may implement a motion estimation function. The step 102 is generally operational to estimate a motion between a current block of a current picture (or field or frame) and a closest matching block in a reference picture (or field or frame). The estimated motion may be expressed as a motion vector that points from the current block to the closest matching reference block. The reference picture may be earlier or later in time than the current picture. The reference picture may be spaced one or more temporal inter-picture distances from the current picture. Each pixel of a picture may be considered to have a luminance (sometimes called "luma" for short) value (or sample) and two chrominance (sometimes called "chroma" for short) values (or samples). The motion estimation is generally performed using the luminance samples.

The MC step 104 may implement a motion compensation function. The step 104 is generally operational to calculate a motion compensated (or predicted) block based on the reference samples received in the signal REF and a motion vector received from the step 102. Calculation of the motion compensated block generally involves grouping a block of reference samples around the motion vector where the motion vector has integer-pel (or pixel or sample) dimensions. Where the motion vector has sub-pel dimensions, the motion compensation generally involves calculating interpolated reference samples at sub-pel locations between the integer-pel locations. The sub-pel locations may include, but are not limited to, half-pel locations, quarter-pel locations and eighth-pel locations. The motion compensated block may be presented in the signal PRED.

The intra-prediction step 106 may implement an inter-prediction function. The step 106 is generally operational to calculate intra-predicted blocks from other blocks internal to the current picture. The intra-predicted blocks may be presented in the signal PRED.

The filter step 108 may implement a spatial filter function. The step 108 is generally operational to spatially filter the reconstructed blocks received in the signal RCN. The filter blocks may be presented as new reference blocks to the circuit 84 in the signal REF'.

The adder step 110 may implement an addition function. The step 110 is generally operational to create residual blocks by adding an inverse of (or subtracting) the motion compensated blocks from the current blocks. The differences may be calculated on a sample-by-sample basis where each sample in a motion compensated block is subtracted from a respective current sample in a current block to calculate a respective residual sample (or element) in a residual block. The residual blocks may be presented in the signal RES.

The adder step 112 may implement an adder function. The step 112 may be operational to add the reconstructed residual samples received via the signal RES' to the motion compensated samples received via the signal PRED to generate reconstructed current samples. The reconstructed current samples may be presented in the signal RCN to the filter step 108.

The transform step 114 may implement transformation, scaling and quantization functions. The step 114 is generally operational to transform the residual samples in the residual blocks into transform coefficients. The step 114 may also be operational to scale and quantize the transform coefficients. The resulting coefficients may be presented in the signal X to the entropy coder step 118 and the step 116.

The scale/inverse quantization step 116 may implement inverse quantization and scale functions. The step 116 is generally operational to inverse quantize and scale the transform coefficients received in the signal X to calculate reconstructed transform coefficients. The step 116 may also be operational to inverse transform the reconstructed transform coefficients to calculate reconstructed residual samples. The step 116 may reverse the quantization, scaling and transformation functions performed by the step 114. The reconstructed residual samples may be transferred to the step 112 in the signal RES'.

The entropy coder step 118 may implement an entropy encoder function. The step 118 is generally operational to entropy encode a string of reordered symbols and syntax elements that represent the resulting transform coefficients, motion vectors, encoding modes and other data. The encoded information may be presented in the signal STREAM. The step 118 may be implemented by the circuit 82 (e.g., the circuit 92).

The switch step 120 may implement a switching function. The switch step 120 may be operational to route the predicted blocks from the step 106 while the step 100 has selected intra-prediction. The switch step 120 may also be operational to route the motion compensated prediction blocks from the step 104 while the step 100 has selected inter-prediction.

Figure 3:
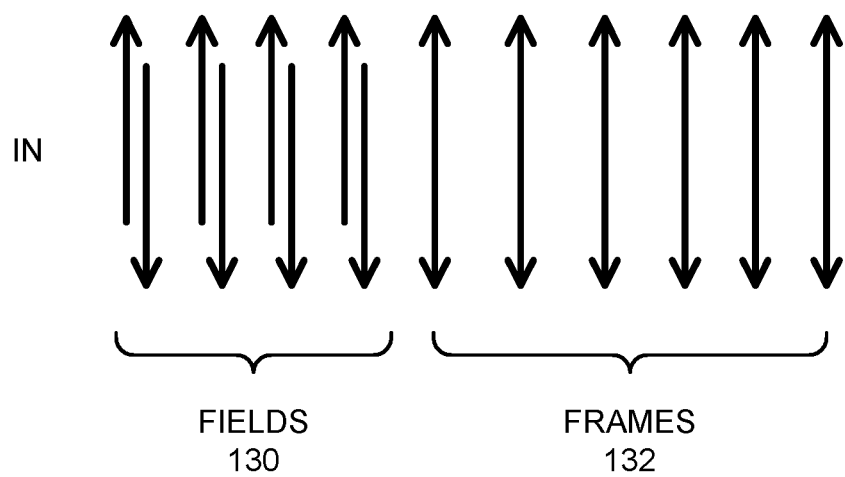
FIG. 3 is a diagram of an example sequence of fields and frames in an input video signal.

Referring to FIG. 3, a diagram of an example sequence of fields and frames in the signal IN is shown. The signal IN may generally includes a mixture of field-based content 130 and frame-base content 132. Two approaches may address the issue of encoding the signal IN using either a field mode or a frame mode: the parallel encoding and the single pass encoding.

Figure 4:
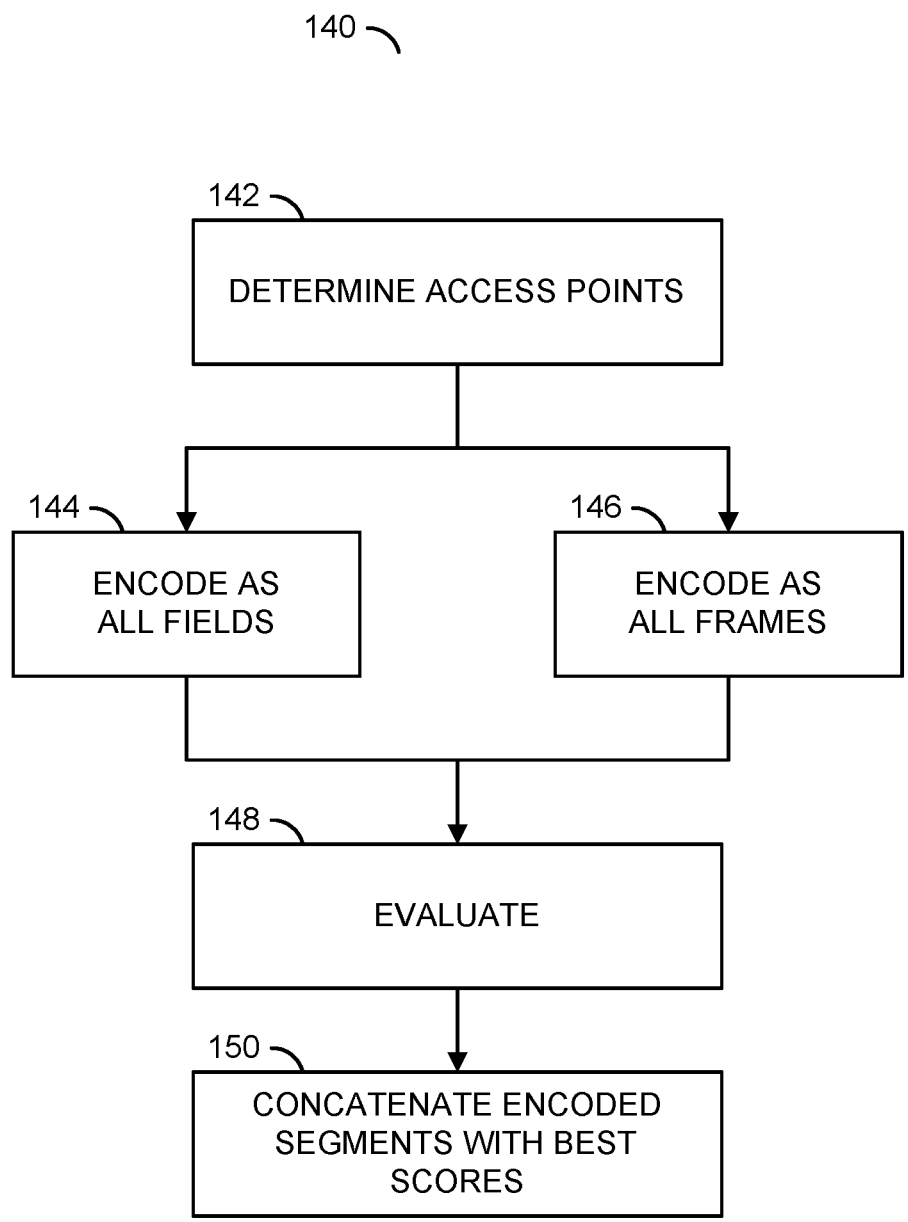
FIG. 4 is a flow diagram of an example method of parallel encoding.

Referring to FIG. 4, a flow diagram of an example method 140 of parallel encoding is shown. The method (or process) 140 may be implemented by the circuits 82 and 84 (e.g., controlled by the controller block 100 in FIG. 2). The method 140 generally comprises a step (or state) 142, a step (or state) 144, a step (or state) 146, a step (or state) 148 and a step (or state) 150. The steps 142-150 may be implemented as hardware, software or a combination of hardware and software.

In the parallel encoding, portions of the signal IN may be encoded as a sequence of both all frames and as a sequence of all fields. The all-frame encoding and the all-field encoding may be evaluated to determine which type of encoding produces a best result. The portions with the best results may be stitched together to create the signal STREAM.

In an initial step 142, the portions may be determined by finding normal access points in the video content that readily support switching between the field mode and the frame mode (e.g., an intra picture and/or a closed Group of Pictures). Each determined portion may be subsequently encoded in parallel as all fields in the step 144 and as all frames in the step 146 using the same access points at the same locations. An evaluation of each encoded portion (or segment) may be performed in the step 148. The best encoding between the all-field encoding and the all-frame encoding for each portion may be selected as part of the step 148. The selected encoded portions may be concatenated (stitched together or appended) in the step 150 to generate a final bitstream in the signal STREAM. In some configurations, the access points may be set at fixed intervals. In other configurations, the access points may be set at arbitrary intervals. Determining the access points may be based on a spatial pre-analysis of interlaced versus progressive property of the content in the signal IN.

Figure 5:
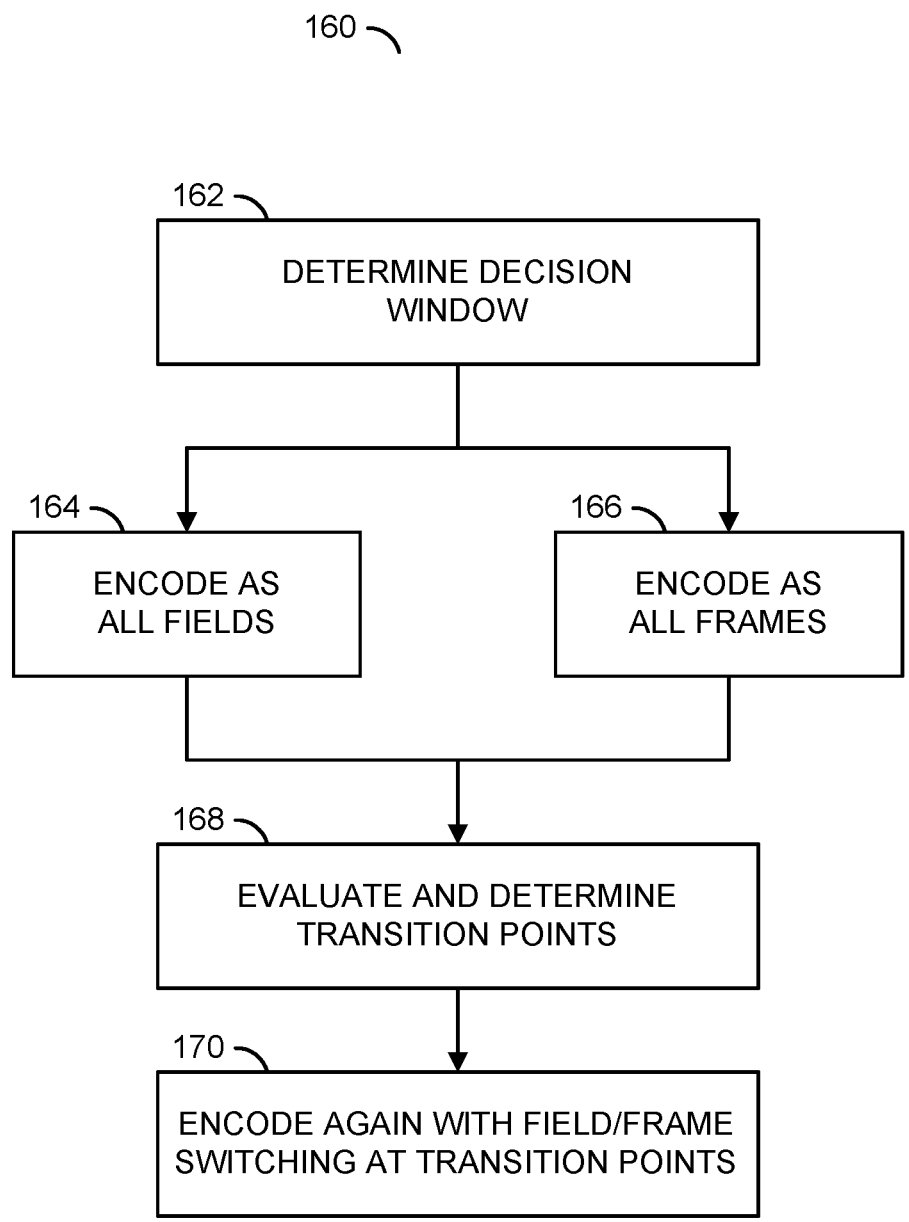
FIG. 5 is a functional block diagram of another example method of parallel encoding.

Referring to FIG. 5, a functional block diagram of another example method 160 of parallel encoding is shown. The method (or process) 160 may be implemented by the circuits 82 and 84 (e.g., controlled by the controller block 100 in FIG. 2). The method 160 generally comprises a step (or state) 162, a step (or state) 164, a step (or state) 166, a step (or state) 168 and a step (or state) 170. The steps 162-170 may be implemented as hardware, software or a combination of hardware and software.

In the parallel encoding, the relative cost may be calculated to determine the more efficient coding technique on various time intervals and identify optimal content transition points. Next, the signal IN may be encoded a third time, switching between field-based encoding and frame-based encoding at the transition points.

In an initial step 162, a decision window may be established. The signal IN within the decision window may be encoded in parallel as all fields in the step 164 and as all frames in the step 166. An evaluation of the encoding results and a determination of optimal (or good) transition points may be determined in the step 168. In the step 170, the best scores between the all-field encoding and the all-frame encoding may be used to encode the signal IN again between the transition points.

In some configurations, the decisions may be based on single picture scores. In other configurations, the decision is generally based on overlapping windows of content (e.g., 16 frames, frames, 64 frames, etc.). Furthermore, the decisions may account for a "transition cost" (e.g., additional intra-picture costs) of the frame-to-field and field-to-frame switching.

Figure 6:
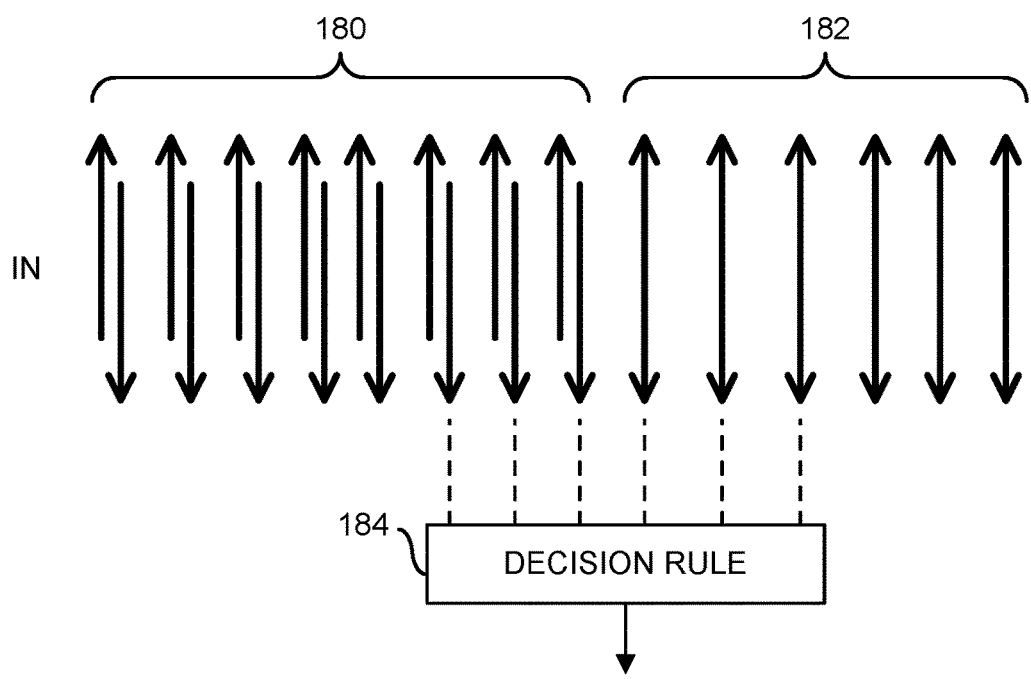
FIG. 6 is a diagram of an example sequence of fields and frames used in a single pass encoding with lookahead.

Referring to FIG. 6, a diagram of an example sequence of fields 180 and frames 182 used in a single pass encoding with lookahead is shown. The signal pass encoding approach may apply a set of decision rules 184 to the fields 180 and the frames 182 received in a decision window of the signal IN. The decision window generally contains multiple (e.g., 6 to 8) field pairs and/or frames. The rules may subsequently be used to switch between the all-field encoding and the all-frame encoding.

Figure 7:
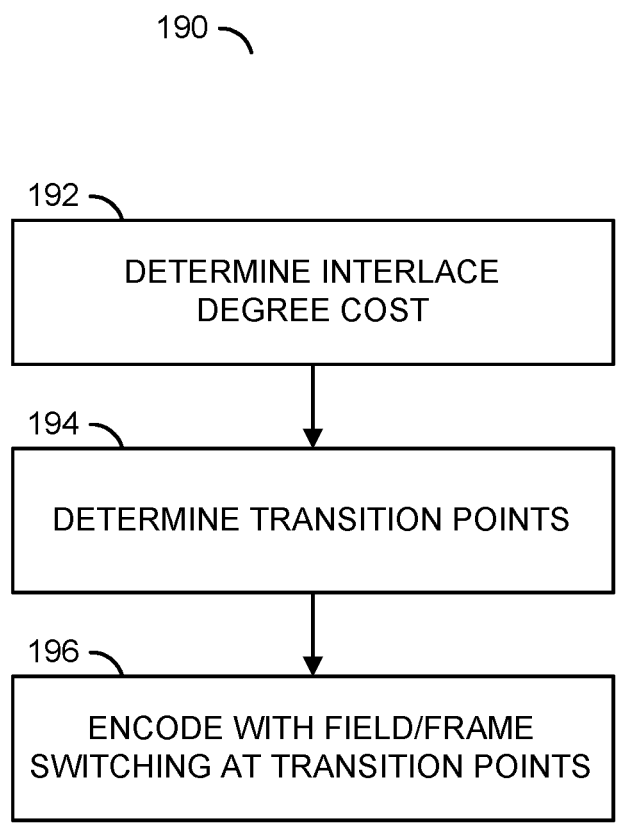
FIG. 7 is a flow diagram of an example method of single pass encoding.

Referring to FIG. 7, a flow diagram of an example method 190 of single pass encoding is shown. The method (of process) 190 may be implemented by the circuits 82 and 84 (e.g., controlled by the controller block 100 in FIG. 2). The method 190 generally comprises a step (or state) 192, a step (or state) 194 and a step (or state) 196. The steps 192-196 may be implemented as hardware, software or a combination of hardware and software.

The signal pass encoding generally uses a window of N frames (or field pairs) to decide a change of encoding mode. The decision is generally based on field/frame tradeoff cost estimates.

In an initial step 192, for each field pair/frame, an estimate of a parameter related to an interlaced degree (e.g., "interlace cost") $C_i$ may be determined. Multiple possible techniques (or methods) with different degrees of complexity may be implemented to calculate the interlace degree cost $C_i$. In the step 194, the transition points may be determined. Next, the signal IN may be encoded with field/frame switching at the transition points in the step 196.

Figure 8:
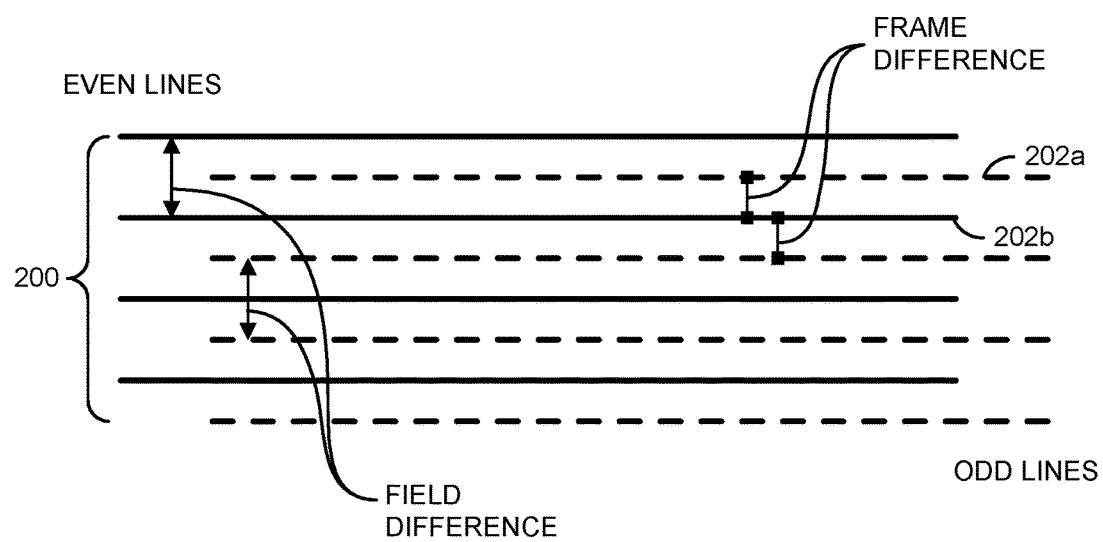
FIG. 8 is a diagram of an example of inter-field line differences and inter-frame line differences used in calculating an interlaced degree cost in accordance with a preferred embodiment of the present invention.

Referring to FIG. 8, a diagram of an example of inter-field line differences and inter-frame line differences used in calculating an interlace degree cost is shown in accordance with a preferred embodiment of the present invention.

In some configurations, a sum of absolute difference (e.g., SAD) based score (e.g., 1-normal or SAD) may be calculated. The absolute difference of vertically adjacent pixels may be measured (i) within the frame 200 and (ii) within the two fields 202a-202b and contributes to two values (e.g., "sum of field difference" and "sum of frame difference"). These two values (or numbers) may be used to measure the interlaced degree cost $C_i$ in the window.

Figure 9:
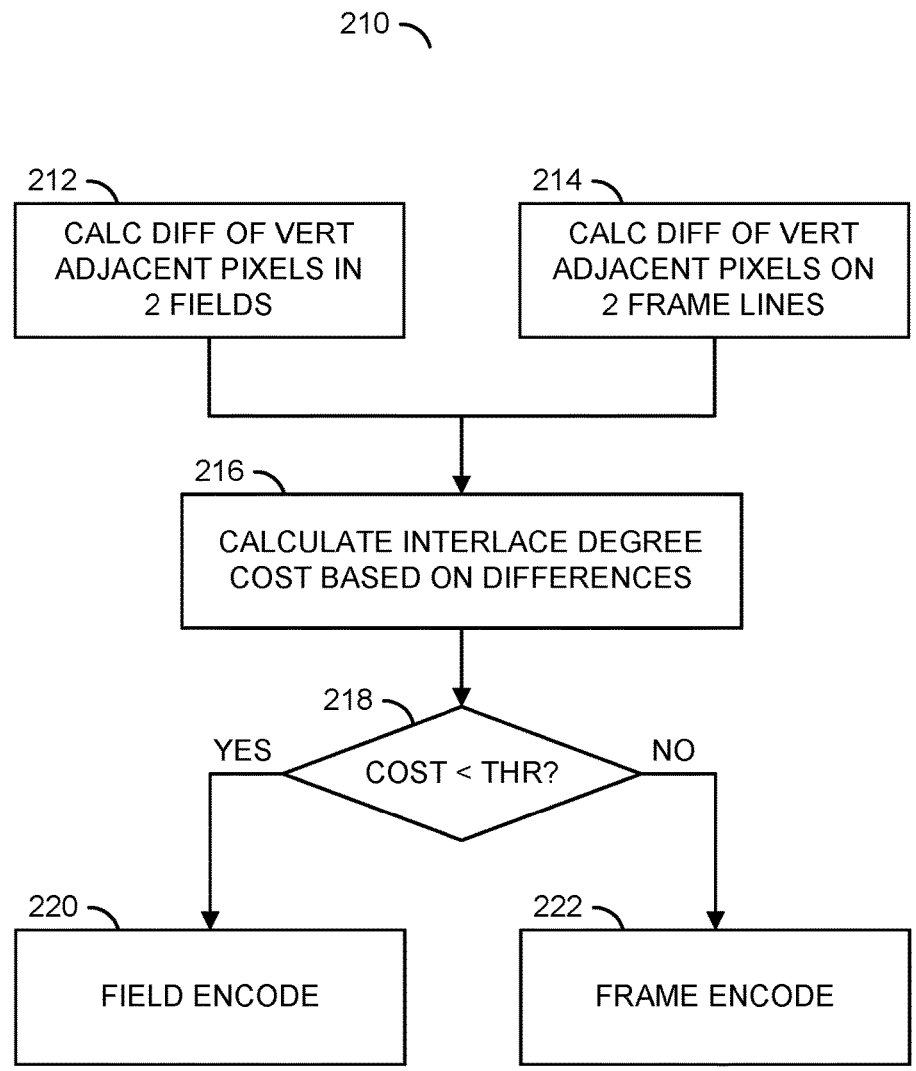
FIG. 9 is a flow diagram of an example method of single pass encoding with lookahead.

Referring to FIG. 9, a flow diagram of an example method 210 of single pass encoding with lookahead is shown. The method (or process) 210 may be implemented by the circuits 82 and 84 (e.g., controlled by the controller block 100 in FIG. 2). The method 210 generally comprises a step (or state) 212, a step (or state) 214, a step (or state) 216, a step (or state) 218, a step (or state) 220 and a step (or state) 222. The steps 212-220 may be implemented as hardware, software or a combination of hardware and software.

In initial steps 212 and 214, the sum of field differences of vertically adjacent pixels in two fields (e.g., step 212), and a sum of frame differences of vertically adjacent pixels in two frame lines (e.g., step 214) may be calculated. In the step 216, the interlace degree cost $C_i$ may be calculated. The estimate is generally a function of {sum of field difference, sum of frame difference}. In some configurations, the interlace degree cost $C_i$ may be calculated per equation 1 as follows:

$$C_i = \{\text{Sum}|\text{Frame diff}|\} / \{\text{Sum}|\text{Field diff}|\} \qquad (1)$$

In the step 218, a ratio of the sum of field difference to the sum of frame difference (e.g., sum of field difference/the sum of frame difference) may be compared with a threshold (e.g., THR=1.2). If the ratio is less than the threshold, the field mode may be preferred to encode the window of the signal IN per the step 220. If the ratio is greater than the threshold, the frame mode may be used in the encoding per the step 222. In some configurations, the sum of absolute differences may be replaced by the sum of squared differences.

Figure 10:
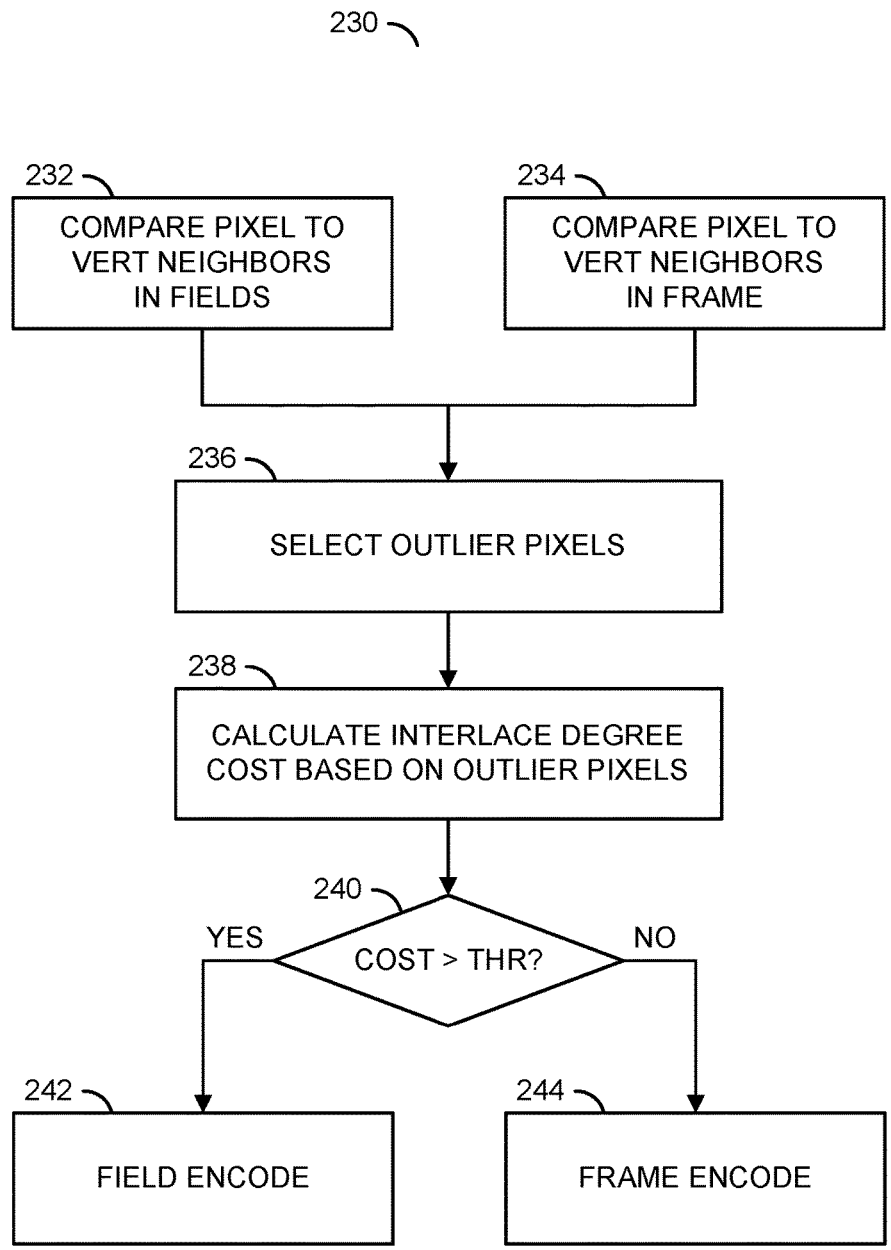
FIG. 10 is a flow diagram of another example method of single pass encoding with lookahead.

Referring to FIG. 10, a flow diagram of another example method 230 of single pass encoding with lookahead is shown. The method (or process) 230 may be implemented by the circuits 82 and 84 (e.g., controlled by the controller block 100 in FIG. 2). The method 230 generally comprises a step (or state) 232, a step (or state) 234, a step (or state) 236, a step (or state) 238, a step (or state) 240, a step (or state) 242 and a step (or state) 244. The steps 232-244 may be implemented as hardware, software or a combination of hardware and software.

The interlace degree cost $C_i$ may be calculated based on an adaptive spatial score (or generalization). For example, only the difference relative to "outlier pixels" may be taken into consideration. In the initial steps 232 and 234, the sum of field differences of vertically adjacent pixels in two fields (e.g., step 232), and a sum of frame differences of vertically adjacent pixels in two frame lines (e.g., step 234) may be calculated. The steps 232 and 234 may compare a pixel (e.g., compare luminance values) with that of the vertical neighbors A (above) and B (below) in the Frame (F(A), F(B)) and field (f(A), f(B)). In the step 236, the outlier pixels P may be selected based on the (luma) comparisons, where either $(P_{luma} > A_{luma}\ \&\&\ P_{luma} > B_{luma})$ or $((P_{luma} < A_{luma})\ \&\&\ (P_{luma} < B_{luma}))$. The symbol "&&" generally represents a logical AND operation (e.g., both the preceding logical expression and the succeeding logical expression must evaluate to true for the entire expression to be true.) The interlace degree cost $C_i$ may be calculated based on the outlier pixels P in the step 238. If the cost is greater than a threshold (e.g., THR) in the step 240, the field mode may be preferred to encode the window of the signal IN per the step 242. If the cost is less than the threshold, the frame mode may be used in the coding per the step 244.

In some configurations, the interlaced degree cost (or score) Ci is generally the number of outlier pixels/total number of pixels (e.g., the decision for field mode is Ci>threshold). In other configurations the interlaced degree cost Ci may be a sum of the SADs of the outlier pixels (e.g., a sum of absolute difference of |(P−A)+(P−B)|/2). Such a configuration generally weighs interlace "motion" higher than noise, since noise may be present in both field and frame cases. In still other configurations, either of the above approaches may be implemented, but count only the pixels whose difference from the neighbors exceeds thresholds T1-T4 (e.g., if $((P_{luma}>A_{luma}+T1)$ && $(P_{luma} B_{luma}+T2))\|$ $((P_{luma}<A_{luma}-T3)$ && $(P_{luma}<B_{luma}-T4))$ where T1 . . . T4 may be the same or different). The symbol "||" may represent a logical OR operation (e.g., at least one of the two expressions has to be true for the entire expression to be true). Furthermore, sum of squared differences (e.g., SSD) may be used instead of the SAD values to give higher weight to more significant differences.

Figure 11:
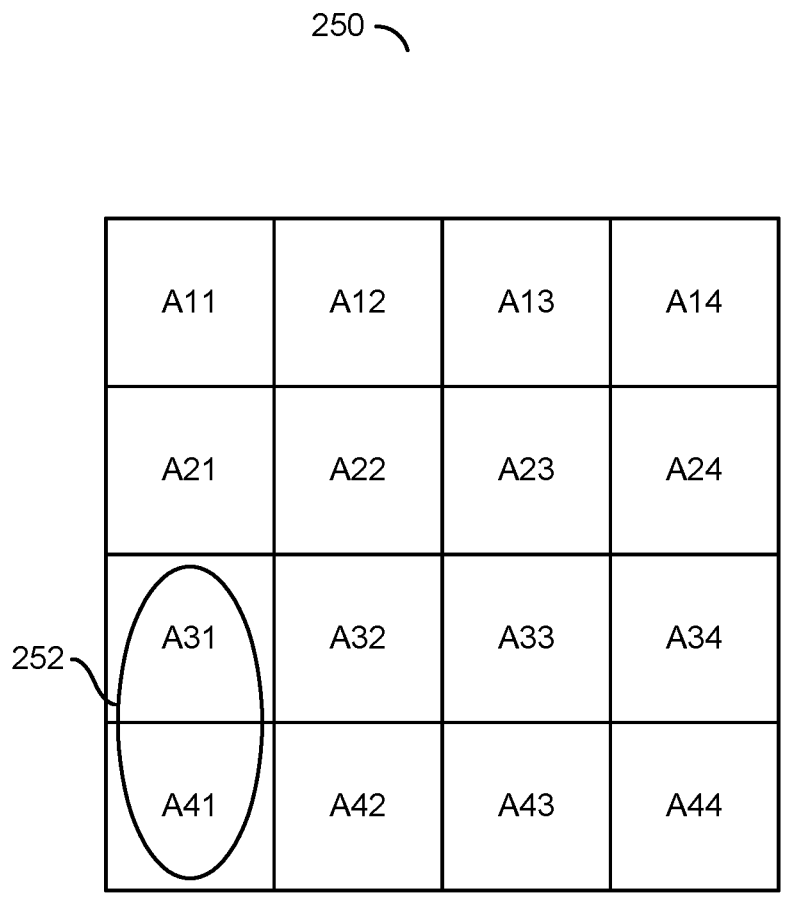
FIG. 11 is a diagram of an example 4×4 set of transform coefficients.

Referring to FIG. 11, a diagram of an example 4×4 set of transform coefficients 250 is shown. The transform coefficients may range from a lowest frequency (e.g., A11) to a highest frequency (e.g., A44). One or more high vertical frequencies 252 (e.g., transform coefficients A31 and A41) may be representative of the interlaced degree.

Figure 12:
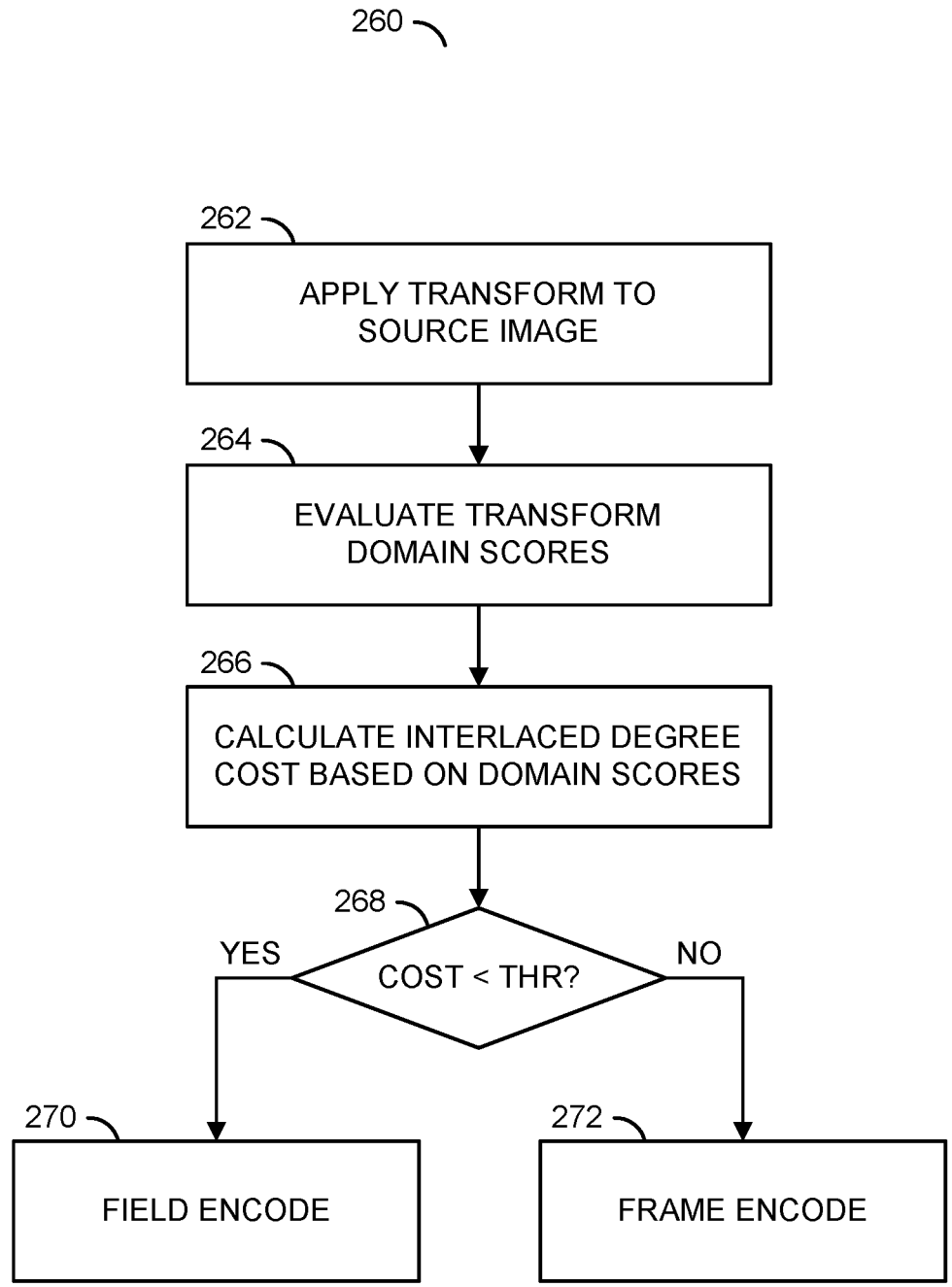
FIG. 12 is a flow diagram of an example method for single pass encoding using a transform cost.

Referring to FIG. 12, a flow diagram of an example method 260 for single pass encoding using a transform cost is shown. The method (or process) 260 may be implemented by the circuits 82 and 84 (e.g., controlled by the controller block 100 in FIG. 2). The method 260 generally comprises a step (or state) 262, a step (or state) 264, a step (or state) 266, a step (or state) 268, a step (or state) 270 and a step (or state) 272. The steps 262-272 may be implemented as hardware, software or a combination of hardware and software.

In an initial step 162, a transform (e.g., DCT or IDT) may be applied to a portion of a source image (or picture). The transform domain scores relative vertical (e.g., interlaced) energy may be evaluated in the step 264. In the step 266, the interlace degree score Ci may be calculated based on the domain scores. The interlace degree cost Ci may be calculated per equation 2 as follows:

$$Ci=SUM\{a|A41|+b|A31|\} \quad (2)$$

Where the sum may be over all 4×4 blocks and a and b may be weighting factors. The interlaced degree cost Ci may also be normalized by the total energy (e.g., SUM |Aij|). If the cost is less than a threshold (e.g., THR) in the step 268, the field mode may be preferred to encode the window of the signal IN per the step 270. If the cost is greater than the threshold, the frame mode may be used in the encoding per the step 272.

In some configurations, the transform may be an approximation of the transform used in the compression standard (e.g., the HEVC standard). In other configurations, the transform is generally the same as the transform used in the compression standard. In still other configurations, the transform may use a quad-tree decomposition (e.g., 32×32→16× 16→8×8→4×4) independently in field and frame representations to find the minimal energy (=estimated coding cost).

In some embodiments, the cost of progressive versus interlaced may be a function of the total transform energy in each mode and the difference between modes. In such a case, the interlaced degree cost Ci may be the sum of the absolute (or squared) vertical high frequencies in the transform.

Referring again to FIG. 7, the initial step 192 may provide an estimation of a field/frame tradeoff. The next step 194 may provide a mode switching decision with lookahead. The estimate generally allows a local decision field versus frame comparison when the picture is taken in isolation. The estimation may be acceptable when only intra coding is used. However, when interframe coding is used, a more complex decision with lookahead may be implemented.

Because a field/frame switch is costly (e.g., code a new intra picture), the switching may be performed conservatively. Furthermore, since intra-refresh is usually mandated (e.g., once every 30 frames) or appropriate for scene change, the closer to a planned intra-refresh the switch occurs, the less costly the switch may be. Scene changes may also be taken into consideration as a mandated intra-refresh point.

The decision function may be based on examining the N picture in the window and N "interlaced cost" (e.g., a value of N may be between 4 and 8), the proximity to a planned intra-refresh, and a "progressive cost penalty" because the intra-frame picture types are generally more costly than a single intra field picture.

Figure 13:
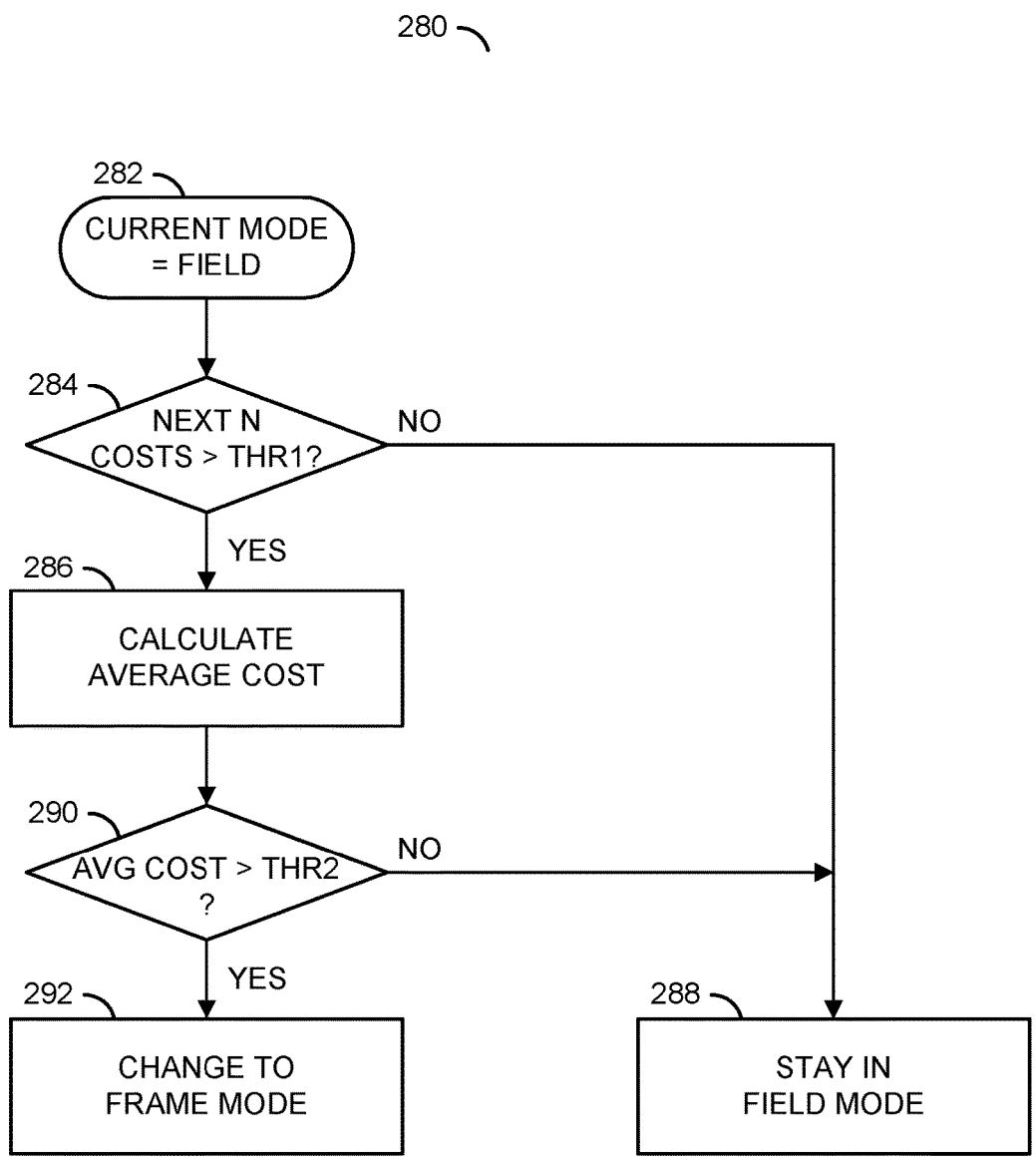
FIG. 13 is a flow diagram of an example switching method starting in a field mode.

Referring to FIG. 13, a flow diagram of an example switching method 280 starting in the field mode 292 is shown. The method (or process) 280 may be implemented by the circuits 82 and 84 (e.g., controlled by the controller block 100 in FIG. 2). The method 280 generally comprises a step (or state) 282, a step (or state) 284, a step (or state) 286, a step (or state) 288, a step (or state) 290 and a step (or state) 292. The steps 282-292 may be implemented as hardware, software or a combination of hardware and software.

Costs of the next N pictures may be considered in the step 284 step. If the next N costs Ci are consistently over a threshold (e.g., THR1), an average C=(1/N)×SUM Ci may be computed in the step 286. If the next N costs Ci are not consistently over the threshold THR1 (e.g., one or more scores are less than the threshold THR1), the coding may remain the field mode per the step 288.

If the average cost C is greater than another threshold (e.g., THR2) in the step 290, the encoding may be switched to the frame mode per the step 292. The threshold THR2 is generally greater than the threshold THR1 and may be a function of the proximity to the planned intra-refresh and the "progressive cost penalty" (e.g., THR2=THR1+Tprox+Tpp, where Tprox is K×{distance to next planned refresh}, K is a constant and Tpp is another constant dependent on the encoder operating point). If the average cost C is not greater than the threshold THR2, the coding may remain in the field mode per the step 288.

Figure 14:
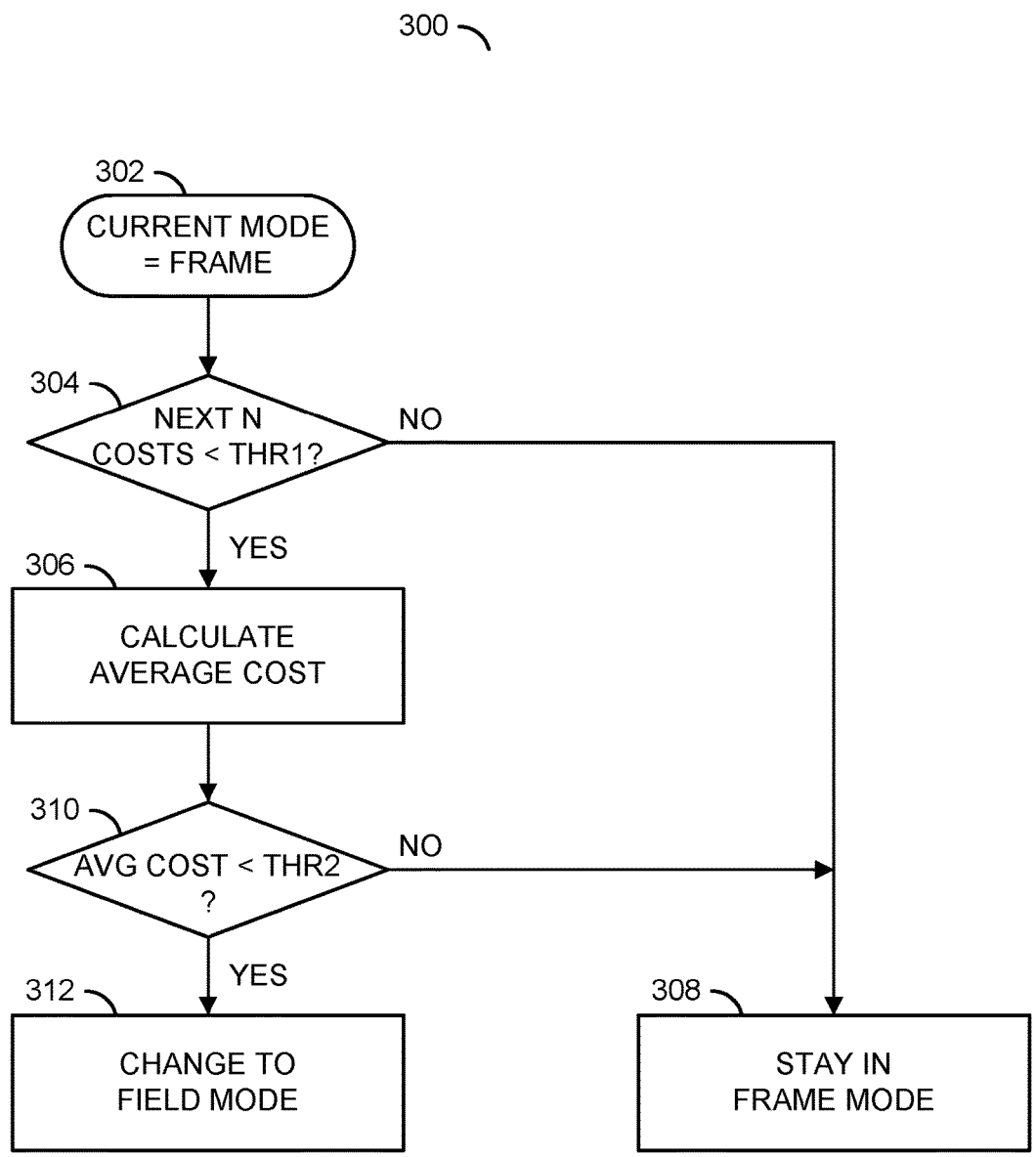
FIG. 14 is a flow diagram of an example switching method starting in a frame mode.

Referring to FIG. 14, a flow diagram of an example switching method 300 starting in the frame mode 302 is shown. The method (or process) 300 may be implemented by the circuits 82 and 84 (e.g., controlled by the controller block 100 in FIG. 2). The method 300 generally comprises a step (or state) 302, a step (or state) 304, a step (or state) 306, a step (or state) 308, a step (or state) 310 and a step (or state) 312. The steps 302-312 may be implemented as hardware, software or a combination of hardware and software.

Costs of the next N (e.g., 4) pictures may be considered in the step 304. If the next N costs Ci are consistently under a threshold (e.g., THR1), an average C=(1/N)×SUM Ci may be calculated in the step 306. If the next N costs Ci are not consistently under the threshold THR1 (e.g., one or more scores are greater than the threshold THR1), the encoding may remain in the frame mode per the step 308.

The average cost C may be compared with another threshold (e.g., THR2) in the step 310. If the average cost C is less than the threshold THR2, the encoding may be changed to the field mode per the step 312. The threshold THR2 is generally a function of the proximity to the planned intra-refresh and the "progressive cost penalty" (e.g., THR2=THR1+Tprox−Tpp, where Tprox is K×{distance to next planned refresh}, K is a constant and Tpp is another constant dependant on the encoder operating point). If the average cost C is not less than the threshold THR2, the coding may remain in the frame mode per the step 308.

In some configurations, instead of basing the decision on the consistency over or below a threshold, the decision to switch or stay in the same encoding mode may be based on a strong majority of the interlaced degree costs Ci (e.g., 70-90% of the Ci are over or below at threshold).

The decision which mode to code in (and the decision to change from one encoding mode to the other) may be a function of both the current encoding state (e.g., interlaced field or progressive frame), the interlaced coding score of the scene, the specified random access properties of the encoder configuration (e.g., GOP length, fixed or variable) and the video content itself.

The switching methods may utilize a decision for every picture. The following shortcuts may provide one or more ways to simplify the switching method. Shortcuts to reduce computation may include, but are not limited to, one or more of (i) checking the switch score only on scene changes or nominal GOP end locations and (ii) evaluating the cost of switching only on those pictures where the score of the "other" mode is lower than the current mode.

Telecine material is generally given special consideration. In 60 Hz countries (e.g., US, Japan, etc.), movie material originally produced at 24 pictures per second may be converted to a 60 fields per second mode by a process called telecine. In telecine, a picture is converted in either two fields or three fields. In the three-field case, the third field may be a copy of the first field. When using the above technique in connection with HEVC encoding, an inverse telecine process may be used before the mode decision and the movie material may appear as a sequence of frames at 24 frames/second. In the context of HEVC, a transition may mean a switch from 24 frames/second to 60 fields/second or from 60 fields/second to 24 frames/second.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:
1. An apparatus comprising:
an interface configured to receive a single video signal comprising a plurality of interlaced fields intermixed with a plurality of progressive frames; and
a circuit configured to (i) generate a plurality of segments by parsing said single video signal, (ii) encode said segments as both (a) a plurality of encoded frames in a plurality of frame segments encoded in a frame mode and (b) a plurality of encoded fields in a plurality of field segments encoded in a field mode and (iii) generate an encoded signal based on said frame segments and said field segments.
2. The apparatus according to claim 1, wherein said circuit is further configured to determine a plurality of points among said interlaced fields and said progressive frames where said single video signal is parsed.

3. The apparatus according to claim 2, wherein said encoded signal is generated by concatenating at each of said points (i) said encoded frames in a corresponding one of said frame segments or (ii) said encoded fields in a corresponding one of said field segments.

4. The apparatus according to claim 2, wherein said points are located at one or more of (i) a plurality of fixed intervals and (ii) a plurality of arbitrary intervals.

5. The apparatus according to claim 2, wherein said points are determined by analyzing a content in said single video signal.

6. The apparatus according to claim 1, wherein (i) said circuit is further configured to calculate a plurality of coding costs incurred while encoding said frame segments and encoding said field segments and (ii) said generation of said encoded signal based on said frame segments and said field segment is generation of said encoded signal by encoding said video signal again with a mode switch between said frame mode and said field mode based on (a) said coding costs and (b) a transition cost to change between said frame mode and said field mode.

7. The apparatus according to claim 6, wherein said mode switch is based on said coding costs of a plurality of single pictures.

8. The apparatus according to claim 6, wherein said mode switch is based on said coding costs of a plurality of overlapping windows of content in said video signal.

9. The apparatus according to claim 1, wherein said interface and said circuit form part of a digital camera.

10. A method for encoding a single video signal with both interlaced content and progressive content, comprising the steps of:
   generating a plurality of segments by parsing said single video signal with a circuit, wherein said single video signal comprises a plurality of interlaced fields intermixed with a plurality of progressive frames;
   encoding said segments as both (i) a plurality of encoded frames in a plurality of frame segments encoded in a frame mode and (ii) a plurality of encoded fields in a plurality of field segments encoded in a field mode; and
   generating an encoded signal based on said frame segments and said field segments.

11. The method according to claim 10, further comprising the step of:
   determining a plurality of points among said interlaced fields and said progressive frames where said single video signal is parsed.

12. The method according to claim 11, wherein said encoded signal is generated by concatenating at each of said points (i) said plurality of frames in a corresponding one of said frame segments or (ii) said plurality of fields in a corresponding one of said field segments.

13. The method according to claim 11, wherein said points are located at one or more of (i) a plurality of fixed intervals and (ii) a plurality of arbitrary intervals.

14. The method according to claim 11, wherein said points are determined by analyzing a content in said single video signal.

15. The method according to claim 10, further comprising the step of:
   calculating a plurality of coding costs incurred while encoding said frame segments and encoding said field segments, wherein said generation of said encoded signal based on said frame segments and said field segment is generating said encoded signal by encoding said video signal again with a mode switch between said frame mode and said field mode based on (a) said coding costs and (b) a transition cost to change between said frame mode and said field mode.

16. The method according to claim 15, wherein said mode switch is based on said coding costs of a plurality of single pictures.

17. The method according to claim 15, wherein said mode switch is based on said coding costs of a plurality of overlapping windows of content in said video signal.

18. The method according to claim 15, wherein said generation of said encoded signal based on said frame segments and said field segments is generating said encoded signal by encoding said video signal again with a mode switch between said frame mode and said field mode based on based on a transition cost to change between said frame mode and said field mode.

19. The method according to claim 10, wherein the steps are performed in a digital camera.

20. The apparatus according to claim 1, wherein said generation of said encoded signal based on said frame segments and said field segments is generation of said encoded signal by encoding said video signal again with a mode switch between said frame mode and said field mode based on based on a transition cost to change between said frame mode and said field mode.

* * * * *